US008866860B2

(12) United States Patent  
Nakayama

(10) Patent No.: US 8,866,860 B2  
(45) Date of Patent: Oct. 21, 2014

(54) SCREEN DISPLAY DEVICE, SCREEN DISPLAY CONTROL METHOD, SCREEN DISPLAY CONTROL PROGRAM, AND INFORMATION TERMINAL DEVICE

(71) Applicant: NEC CASIO Mobile Communications, Ltd., Kawasaki (JP)

(72) Inventor: Akira Nakayama, Kawasaki (JP)

(73) Assignee: NEC CASIO Mobile Communications Ltd., Kawasaki-shi (JP)

( * ) Notice: Subject to any disclaimer, the term of this patent is extended or adjusted under 35 U.S.C. 154(b) by 135 days.

(21) Appl. No.: 13/659,158

(22) Filed: Oct. 24, 2012

(65) Prior Publication Data

US 2013/0106921 A1　May 2, 2013

(51) Int. Cl.
*G09G 5/10* (2006.01)
*G06F 3/01* (2006.01)
*G06F 3/14* (2006.01)

(52) U.S. Cl.
CPC ........ *G09G 5/10* (2013.01); *G06F 3/013* (2013.01); *G06F 3/1446* (2013.01)
USPC .......................................... 345/690; 345/212

(58) Field of Classification Search
None
See application file for complete search history.

(56) References Cited

U.S. PATENT DOCUMENTS 6,608,615 B1 *　8/2003　Martins .......................... 345/156
8,648,880 B2 *　2/2014　Namba .......................... 345/635

FOREIGN PATENT DOCUMENTS

| JP | 6318235 A | 11/1994 |
| JP | 07-146845 A | 6/1995 |
| JP | 2003-174505 A | 6/2003 |
| JP | 2010-152443 A | 7/2010 |

OTHER PUBLICATIONS

Office Action dated Jan. 21, 2014, issued by the Japan Patent Office in corresponding Japanese Application No. 2010-206384.
Communication dated May 7, 2014, issued by the Japanese Patent Office in corresponding Application No. 2010-206384.

* cited by examiner

*Primary Examiner* — Jason Olson
(74) *Attorney, Agent, or Firm* — Sughrue Mion, PLLC

(57) ABSTRACT

A screen display device includes a screen display unit having a first screen, and a screen display unit having a second screen; a record analysis unit that generates history information based on user sight line information showing a user's sight line; a switchover control information storage unit that stores switchover control information including a sight line movement condition and a time condition, and control information; and a screen display control unit that refers to the switchover control information storage unit. The screen display control unit compares the history information with the sight line movement condition and the time condition. The screen display control unit performs control of switching display content and energization control content of each of the first and second screens based on the control information in a case of the history information satisfying the sight line movement condition and the time condition.

5 Claims, 3 Drawing Sheets

SCREEN DISPLAY DEVICE, SCREEN DISPLAY CONTROL METHOD, SCREEN DISPLAY CONTROL PROGRAM, AND INFORMATION TERMINAL DEVICE

BACKGROUND OF THE INVENTION

1. Field of the Invention

The present invention relates to a screen display device, a screen display control method, and a screen display control program used preferably in a terminal device such as a mobile terminal, and an information terminal device.

2. Description of Related Art

In recent years, due to the popularity of electronic books, mobile devices that have large liquid crystal displays including a touch panel such as mobile telephones and special-purpose terminals have started to appear. From now on, many mobile terminals including multiple screens are envisaged to be released. In a terminal that is constituted with a plurality of screens, when continuing to display on the plurality of screens, the power consumption increases. As a result, issues arise such as battery longevity. To deal with such issues, Japanese Unexamined Patent Application, First Publication No. H07-146845 (hereinbelow referred to as Patent Document 1) proposes technology that identifies which screen the user is looking at by detecting the sight line of the user, and individually controls the brightness of a plurality of screens. Japanese Unexamined Patent Application, First Publication No. 2003-174505 (hereinbelow referred to as Patent Document 2) proposes technology to control the power consumption required for screen display by using sight line detection.

In many electronic book readers that are currently sold, page turning of the content such as a novel is performed by a physical button or touch-panel operation. When actually reading content using this kind of terminal, with the terminal secured with one hand, the page-turning operation must be performed by the other hand. Effort is therefore required each time a page-turning operation is performed. In light of these factors, when considering future mobile devices, reduction of power consumption as shown in Patent Document 1, and improvement in operability such as page turning are considered to become issues.

SUMMARY OF THE INVENTION

One exemplary object of the present invention is to provide a screen display device, a screen display control method, and a screen display control program as well as an information terminal device that can solve the aforementioned issues.

In order to resolve the aforementioned issues, a screen display device according to an exemplary aspect of the present invention includes: a plurality of screen display units that include a screen display unit having a first screen, and a screen display unit having a second screen; a record analysis unit that generates history information based on user sight line information showing a user's sight line, the history information showing movement of the user's sight line between the first and second screens and dwell time of the user's sight line for each of the first and second screens; a switchover control information storage unit that stores switchover control information including a sight line movement condition and a time condition, and control information, the sight line movement condition and the time condition corresponding to sight line movement and dwell time and serving as conditions for screen control, the control information showing control content of the first and second screens; and a screen display control unit that refers to the switchover control information storage unit, the screen display control unit comparing the history information with the sight line movement condition and the time condition, the screen display control unit performing control of switching display content and energization control content of each of the first and second screens based on the control information in a case of the history information satisfying the sight line movement condition and the time condition.

According to an exemplary embodiment of the present invention, in a terminal device that has a plurality of screens, control of the display content on each screen and energization state becomes possible by the sight line movement of the user who is using the terminal and the dwell state of that sight line on the screen.

EXEMPLARY EMBODIMENT

Figure 1:
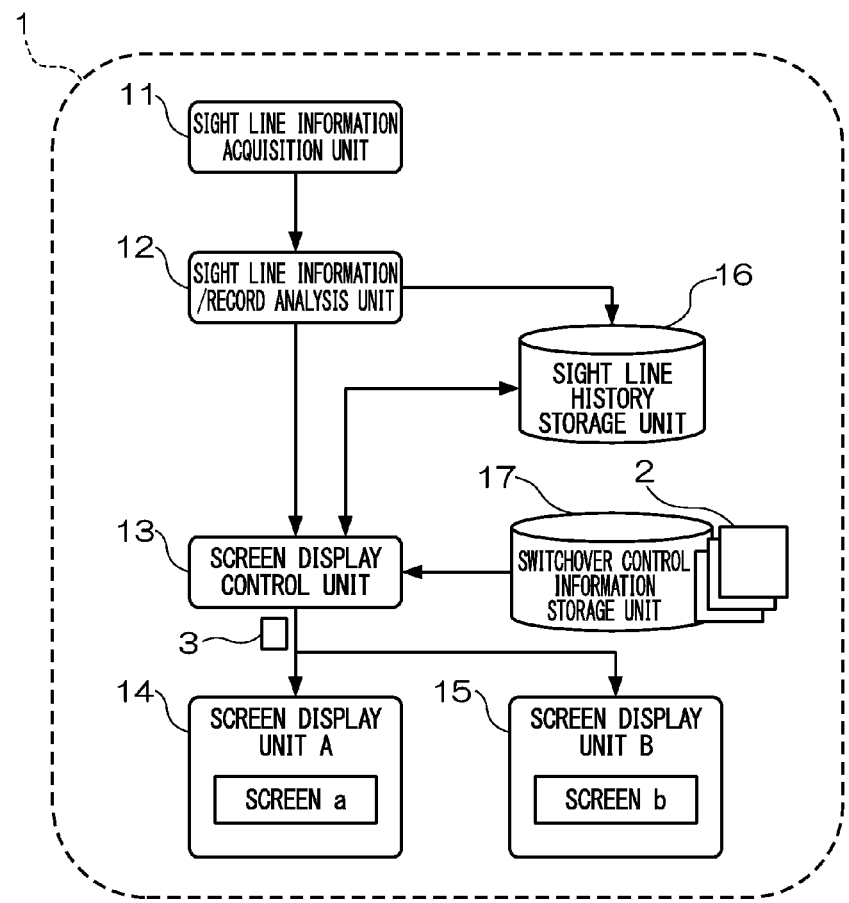
FIG. 1 is a block diagram that shows the constitution of a mobile terminal according to a first exemplary embodiment of the present invention.
Figure 2A:
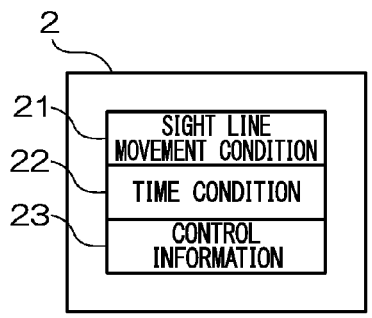
FIG. 2A is a diagram that shows a configuration example of switchover control information used by the mobile terminal of FIG. 1.
Figure 2B:
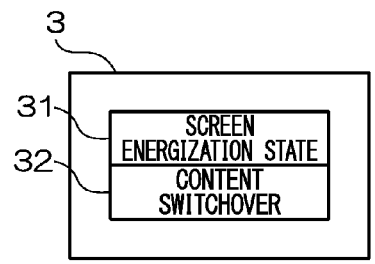
FIG. 2B is a diagram that shows a configuration example of a screen control change notification that is used by the mobile terminal of FIG. 1.

Next, the constitution of a first exemplary embodiment of the present invention shall be described in detail referring to FIG. 1, FIG. 2A and FIG. 2B. Referring to FIG. 1, an information terminal device according to the first exemplary embodiment of the present invention is constituted as a mobile terminal 1 such as a mobile phone, PDA or electronic book reader. The mobile terminal 1 of the present exemplary embodiment includes a sight line information acquisition unit 11, a sight line information/record analysis unit (hereinbelow also simply referred to as a record analysis unit) 12, a screen display control unit 13, a screen display unit A 14, a screen display unit B 15, a sight line history storage unit 16, and a switchover control information storage unit 17.

The sight line information acquisition unit 11 includes a sight line sensor. The sight line information acquisition unit 11 detects whether the sight line of the user is directed toward a screen 'a' that the screen display unit A 14 has, directed toward a screen 'b' that the screen display unit B 15 has, or directed elsewhere. The sight line information acquisition unit 11 at each given length of time passes to the record analysis unit 12 information of the user sight line that it has detected as user sight line information. In this exemplary embodiment, the user sight line information indicates that "the user sight line is at screen 'a'", "the user sight line is at screen 'b'", or "the user sight line is somewhere other than screen 'a' or screen 'b'". The constitution of the sight line sensor is not particularly limited. As the sight line sensor, for example a constitution may be used that includes an infrared light emitting diode, an imaging element, and a signal processing device, and detects the direction of the sight line by extracting movement of the user's pupils.

The record analysis unit 12 receives the user sight line information from the sight line sensor 11. The record analysis unit 12 analyzes the sight line movement history between the screens and the sight line dwell time based on a plurality of user sight line information. The record analysis unit 12 stores the analyzed result as history information in the sight line history storage unit 16. The record analysis unit 12 sends a sight line history change notification to the screen display control unit 13 in the case of having updated the history information in the sight line history storage unit 16. The history information is information that expresses the sight line movement history and the sight line dwell time. The sight line movement history is information that expresses the change or continuation state of the user sight line information. The sight line dwell time is information that indicates the time that the sight line was continuously directed at the screen 'a', the screen 'b', or elsewhere, and the cumulative time of that continuation time. For example, in the case of the sight line having moved from the screen 'a' to the screen 'b', the sight line movement history shows "from screen 'a' to screen 'b'", the sight line dwell time shows the time during which the sight line dwelled at the "screen 'a'" prior to moving, and each cumulative dwell time of "screen 'a'", "screen 'b'", and "elsewhere" within the predetermined time prior to movement (or within a predetermined sight line movement number).

The screen display control unit 13, upon receiving the sight line history update notification from the record analysis unit 12, acquires switchover control information 2 from the switchover control information storage unit 17. The switchover control information 2 is information that includes the conditions for changing the screen control content and the control content that corresponds to each condition. The switchover control information 2 is, for example, constituted by including a sight line movement condition 21, a time condition 22, and control information 23 as shown in FIG. 2A. The sight line movement condition 21 is information that expresses the condition corresponding to a movement content between the screen 'a' and the screen 'b'. The sight line movement condition 21 includes, for example, information such as "movement from the screen 'a' to the screen 'b'", "movement from the screen 'b' to the screen 'a'", and the like. The time condition 22 is information that shows the time condition corresponding to the sight line history. The time condition 22 shows for example "time during which the sight line was placed on a screen prior to sight line movement occurrence" (for example, "the sight line was on the screen 'a' for 10 seconds prior to a sight line movement occurrence") and "cumulative time that the sight line was placed on the screen 'b'". The control information 23 shows the screen control change content for the screen display unit A 14 and the screen display unit B 15 in the case of the sight line movement condition 21 and the time condition 22 being satisfied.

The screen display control unit 13 compares whether the history information that is stored in the sight line history storage unit 16 matches the sight line movement condition 21 and the time condition 22 that are included in the switchover control information 2 that is acquired. In the case of the history information matching the conditions, the screen display control unit 13 performs a screen control change notification 3 to the screen display unit A 14 and the screen display B 15, in accordance with the content that is set in the control information 23. Also, for example in the case of completing the comparison process between the history information that is stored in the sight line history storage unit 16 and the switchover control information 2, the screen display control unit 13 deletes the history information in the sight line history storage unit 16. The screen control change notification 3, as shown in FIG. 2B, includes a screen energization state 31 and a content switchover 32. The screen energization state 31 is information that shows the energization state after a change to the screen 'a' and the screen 'b'. The content switchover 32 is information that shows the content of the content switchover after a change to the screen 'a' and the screen 'b'. The content switchover 32 may be the very information that expresses the content that is to be shown on each screen after the content switchover, or information that includes information that shows the storage location of that content. The mobile terminal 1 is provided with a constitution for storing the content shown on each screen in a built-in or removable storage device in a format that can be switchably displayed in screen units (that is to say, for each screen).

The screen display unit A 14 includes a screen 'a' for displaying content to the user. The screen display A 14, upon receiving the screen control change notification 3 from the screen display control unit 13, performs ON/OFF control of the energization state or ordinary/power-saving control for the screen 'a' in accordance with the screen energization state 31 that is set in the screen control change notification 3. The screen display unit A 14, also in accordance with the setting of the content switchover 32, performs a content display switchover, which is a switchover of the display content for each page of the screen 'a' (that is to say, every screen).

The screen display unit B 15 includes a screen 'b' for displaying content to the user. The operation of the screen display unit B 15 is the same as the screen display unit A 15.

The history information that is output from the record analysis unit 12 is updated and saved as needed to the sight line history storage unit 16. The history information that is output from the record analysis unit 12 is history information that shows the sight line movement history and sight line dwell time that are obtained by the record analysis unit 12 analyzing the user sight line information that is output from the sight line sensor 11.

The screen display control unit 13 refers to the history information that shows the sight line movement history and sight line dwell time that are stored in the sight line history storage unit 16. Moreover, the screen display control unit 13 deletes history information that shows sight line movement history and sight line dwell time is performed at the aforementioned specific timing.

The switchover control information storage unit 17 holds a plurality of switchover control information 2. The switchover control information 2 is referred to by the screen display control unit 13.

Figure 3:
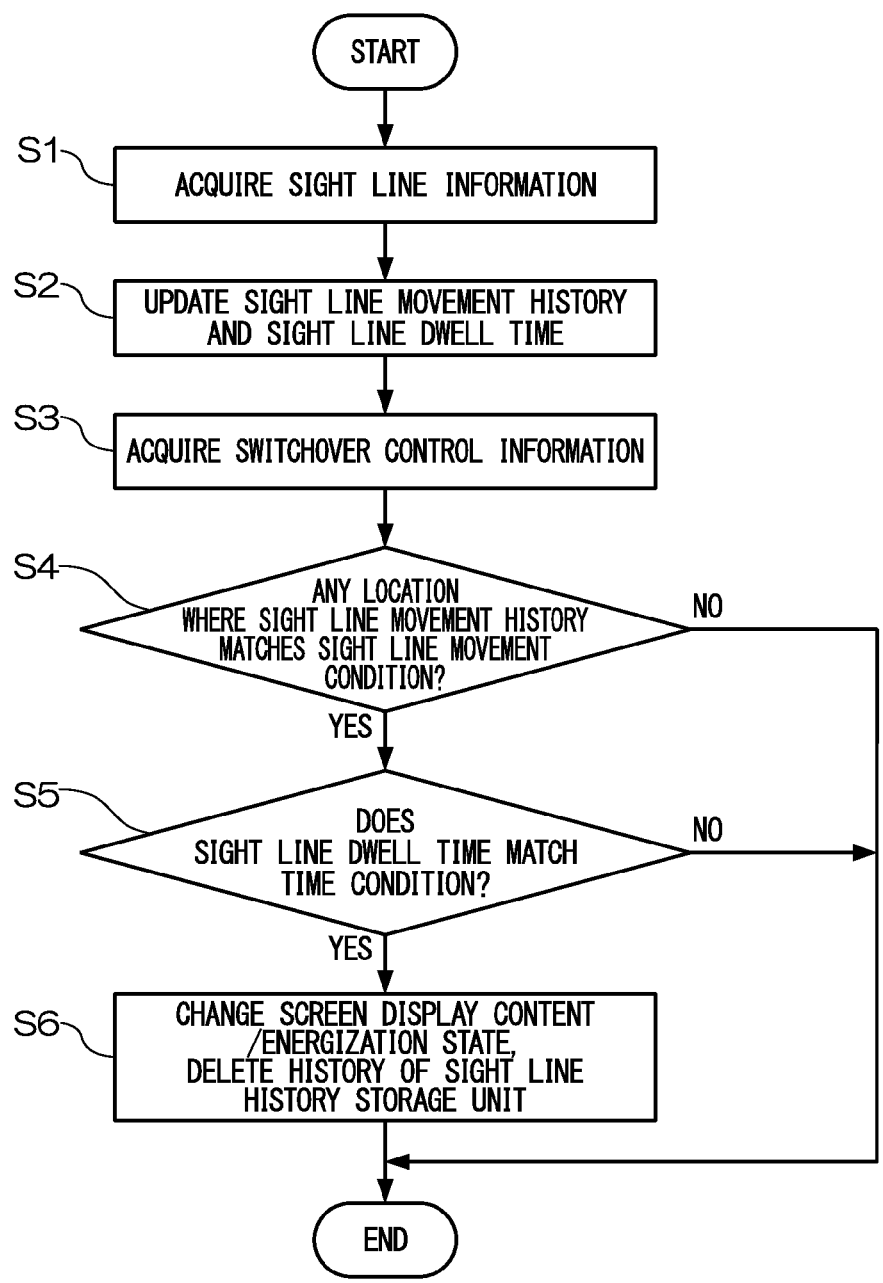
FIG. 3 is a flowchart for explaining the operation of the mobile terminal of FIG. 1.

Next, referring to FIG. 3, the flow of the process relating to image display control in the mobile terminal 1 of FIG. 1 shall be described. FIG. 3 shows the operation sequence when the sight line information acquisition unit 11 has started periodically acquiring a user's sight line information. That is to say, whenever the sight line information acquisition unit 11 acquires user sight line information, the process of Step S1 onward is performed repeatedly.

When the sight line information acquisition unit 11 starts the operation, information is acquired by the sight line sensor that shows whether the user's sight line is at the screen 'a', at the screen 'b', or elsewhere (Step S1). The sight line information acquisition unit 11 sends the acquired information as user sight line information to the record analysis unit 12.

The record analysis unit 12 receives the user sight line information from the sight line sensor 11, and generates history information that includes the sight line movement history between the screens and sight line dwell time. The record analysis unit 12 updates the history information in the sight line history storage unit 16 based on the generated history information (Step S2). Afterward, the record analysis unit 12 sends a sight line history update notification to the screen display control unit 13.

Upon receiving the sight line history update notification from the record analysis unit 12, the screen display control unit 13 acquires the switchover control information 2 from the switchover control information storage unit 17 (Step S3).

When the screen display control unit 13 acquires the switchover control information 2, it first acquires the sight line movement condition 21 that is included in the switchover control information 2. The screen display control unit 13 confirms whether there is any location where the sight line movement condition 21 and the sight line movement history within the history information that is included in the sight line history storage unit 16 agree. As a specific example, when "movement from the screen 'a' to the screen 'b'" is set in the sight line movement condition 21, the screen display control unit 13 confirms whether there is information that shows sight line movement from the screen 'a' to the screen 'b' in the sight line movement history. In the case of having satisfied the condition, the screen display control unit 13 continues the process, and in the case of not being able to satisfy the condition, it ends the process here (Step S4).

Next, the screen display control unit 13 acquires the time condition 22 that is included in the switchover control information 2. The screen display control unit 13 confirms whether there is any location where the time condition 22 and the sight line dwell time within the history information that is included in the sight line history storage unit 16 agree. As a specific example, in the case of "the sight line is at the screen 'a' for seconds prior to a sight line movement occurrence" being set to the time condition 22, the screen display control unit 13 confirms whether there is information that shows that the sight line continued for 10 seconds at the screen 'a' during the sight line dwell time. In the case of the condition being satisfied, the screen display control unit 13 continues the process, and in the case of the condition not being satisfied, it ends the process here (Step S5).

In the case of having determined to continue the process in Step S5, the screen display control unit 13 creates the screen control change notification 3 based on the control information that is included in the control information 23, and sends it to the screen display unit A 14 and the screen display unit B 15. Moreover, the screen display control unit 13 deletes the sight line movement history and the sight line dwell time that are stored in the sight line history storage unit 16 at this time. The screen display unit A 14 and the screen display unit B 15 that have received the notification perform a change of the display content and energization control on the display screen 'a' and screen 'b' in accordance with the conditions of the screen energization state 31 and content switchover 32, based on the screen control change notification 3 (Step S6).

Thereby, it becomes possible to perform updating of the display content and energization control of the screen 'a' and the screen 'b' based on the user sight line information, in accordance with the conditions stored in advance as the switchover control information 2 in the switchover control information storage unit 17.

A specific example of the content switchover control shall be described. In this example, "movement front the screen 'a' to the screen 'b'" is set as the sight line movement condition 21, and "the sight line is on the screen 'a' for 10 seconds prior to a sight line movement occurrence" is set as the time condition 22. Also, in this example, the user is holding the mobile terminal 1 in the state of the screen 'a' and the screen 'b' of the mobile terminal 1 being arranged side-by-side (in this case, in the state of the screen 'a' being arranged on the observer's left, while the screen 'b' is on the observer's right). The content that is shown on the screen 'a' and the screen 'b' is a novel written vertically.

For example, the following situation shall be assumed. Namely, the content of page 1 of the novel is displayed on screen 'b', while the content of page 2 of the novel is displayed on screen 'a'. In this display state, the user reads the novel from page 1 (screen 'b') to page 2 (screen 'a'), and when page 2 has been read, the sight line of the user moves from screen 'a' to screen 'b'. In the case where the user directs his or her sight line at page 2 (screen 'a') for 10 seconds or more prior to this sight line movement, the aforementioned sight line movement condition 21 and the time condition 22 are satisfied. As a result, the content switchover control is performed. This content switchover performs the switchover of displaying the content of page 3 of the novel on screen 'b', and the content of page 4 of the novel on screen 'a'. By this switchover process, the user can perform a page-turning operation with sight line movement.

In the above example, as control of the screen energization state, it is possible to perform the following control. In this example, as the initial screen energization state control, the screen 'b' is set to energization (or the brightness of the screen 'b' is made high), while the screen 'a' is set to non-energization (or the brightness of the screen 'a' is made low). In this state, in the case of sight line movement to the screen 'a' having occurred, as control of the screen energization state, the screen 'b' is set to non-energization (or the brightness of the screen 'b' is made lower), while the screen 'a' is set to energization (or the brightness of the screen 'a' is made high).

The storage units such as the sight line history storage unit 16 and the switchover control information storage unit 17 may each be provided as independent storage devices, or they may be constituted by providing corresponding storage regions in one or a plurality of storage devices. It is possible to constitute the units such as the sight line information acquisition unit 11, the record analysis unit 12, and the screen display control unit 13 using common hardware for one or all of the units, with there being no need to have separate hardware configurations.

It is possible to obtain the following effects according to the present exemplary embodiment. The first effect is to able to switch over the content that is displayed in accordance with the movement of the user's sight line between two screens. The reason for that is that by setting the content switchover and energization control conditions corresponding to the user's sight line movement between two screens as the switchover control information 2 in advance, it is possible to perform energization control and content switchover in accordance with the conditions when a user sight line movement occurs between the two screens.

The second effect is to able to prevent screen switchover by momentary sight line movement. The reason for that is it is possible to ensure that screen switchover does not occur under the condition of a momentary sight line movement by attaching a time condition to the sight line, and not relying solely on movement of the user's sight line between two screens.

The third effect is to able to display only the screen of the sight line movement destination in conformity with the movement of the user's sight line between the two screens.

Figure 4:
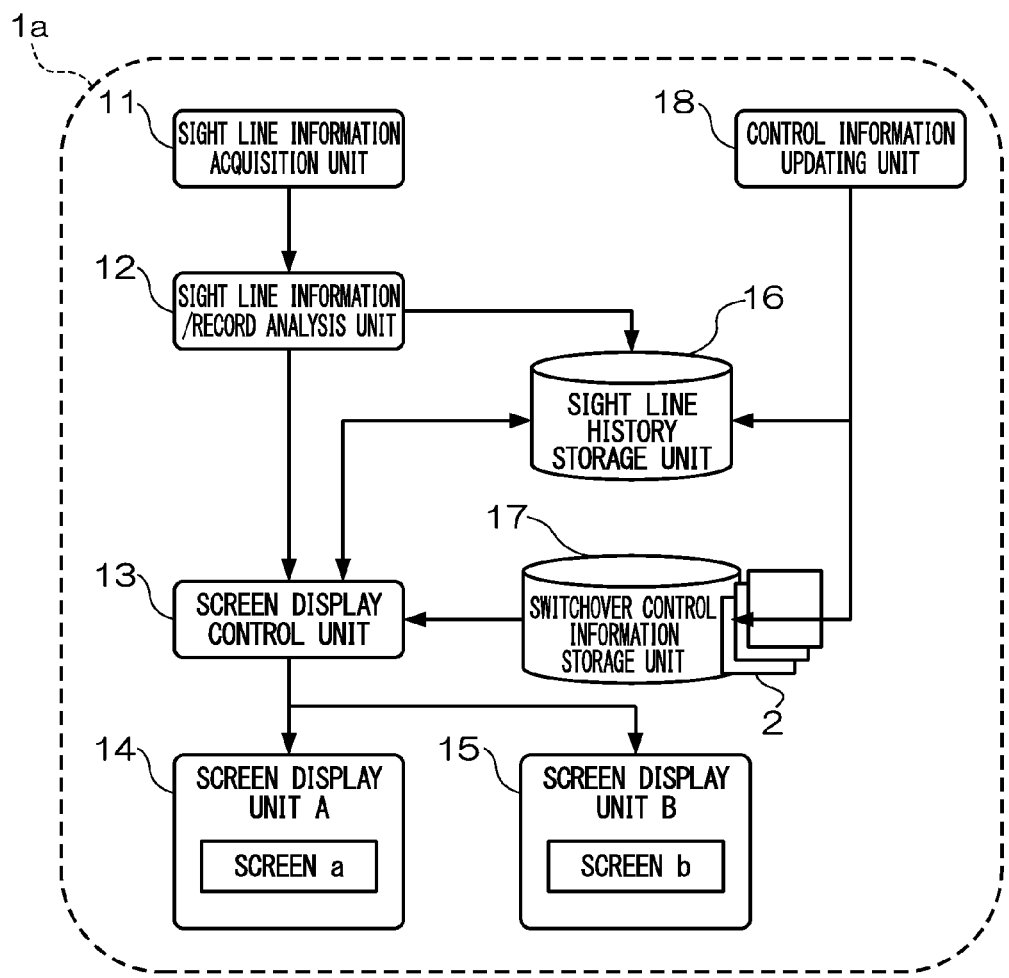
FIG. 4 is a block diagram that shows the constitution of a mobile terminal according to a second exemplary embodiment of the present invention.

Next, referring to FIG. 4, a second exemplary embodiment of the present invention shall be described. The basic constitution of the second exemplary embodiment shown in FIG. 4 is the same as the aforementioned first exemplary embodiment. However, compared with the first exemplary embodiment, the second exemplary embodiment is further conceived with respect to the setting of the switchover control information 2. In the exemplary embodiment shown in FIG. 4, the mobile terminal 1a further includes a control information updating unit 18. The other constitutions of the mobile terminal 1a are the same as the constitution shown in FIG. 1. However, in the second exemplary embodiment, a constitution for receiving updating instruction from the control information updating unit 18 is added to the sight line history storage unit 16 and the switchover control information storage unit 17.

The control information updating unit 18 adds the following operation to the operation described referring to FIG. 3.

The control information updating unit 18 is a portion of the application that is executed by the mobile terminal 1a (the control program of the display content in this exemplary embodiment). The control information updating unit 18 makes changes, additions, and deletions of the switchover control information 2 to the switchover control information storage unit 17 by a request from the application. Also, at this time, the control information updating unit 18 performs deletion of the history information that includes the sight line movement history and the sight line dwell time stored in the sight line history storage unit 16.

By the addition of this operation, it is possible to change the switchover control information 2, which was fixed in the mobile terminal 1, for each application in the mobile terminal 1a.

In the mobile terminal 1 of the first exemplary embodiment of FIG. 1, setting a condition between two screens was assumed by assigning the screen 'a' and screen 'b' respectively to the screen display unit A 14 and the screen display unit B 15, respectively, but it is not limited to this constitution. The mobile terminal 1 may include a constitution in which, by additionally assigning a screen display unit and a screen, they behave similarly to the screen display unit A 14. Thereby, it becomes possible to perform screen control in the mobile terminal 1 by a user's sight line with three screens or more.

The exemplary embodiments of the present invention can be used for the purpose of controlling the content that is displayed on a plurality of screens with a sight line, and controlling displayed content. For this reason, their utilization in fields such as electronic book readers and mobile phones having a plurality of screens is considered.

The mobile terminals according to the exemplary embodiments of the present invention or their internal configurations can be realized by using a computer and peripheral devices thereof and executing a program with the computer.

The program in this case can be distributed via a computer-readable recording medium or communication lines.

The screen display device may include the record analysis unit 12, the screen display control unit 13, the display unit A 14, the display unit B 15, the sight line history storage unit 16, and the switchover control information storage unit 17, among the mobile terminal 1 of FIG. 1.

Further Exemplary Embodiment

An information terminal device includes a screen display device. The screen display device includes: a plurality of screen display units that include a screen display unit having a first screen, and a screen display unit having a second screen; a record analysis unit that generates history information based on user sight line information showing a user's sight line, the history information showing movement of the user's sight line between the first and second screens and dwell time of the user's sight line for each of the first and second screens; a switchover control information storage unit that stores switchover control information including a sight line movement condition and a time condition, and control information, the sight line movement condition and the time condition corresponding to sight line movement and dwell time and serving as conditions for screen control, the control information showing control content of the first and second screens; and a screen display control unit that refers to the switchover control information storage unit, the screen display control unit comparing the history information with the sight line movement condition and the time condition, the screen display control unit performing control of switching display content and energization control content of each of the first and second screens based on the control information in a case of the history information satisfying the sight line movement condition and the time condition.

While the invention has been described with reference to exemplary embodiments thereof, the invention is not limited to above embodiments. Within the scope of the present invention, it is possible to make various changes in the form and details of the present invention that can be understood by a person skilled in the art.

What is claimed is:

1. A screen display device comprising:
    a plurality of screen display units that include a screen display unit having a first screen, and a screen display unit having a second screen;
    a record analysis unit that generates history information based on user sight line information showing a user's sight line, the history information showing movement of the user's sight line between the first and second screens and dwell time of the user's sight line for each of the first and second screens;
    a switchover control information storage unit that stores switchover control information including a sight line movement condition and a time condition, and control information, the sight line movement condition and the time condition corresponding to sight line movement and dwell time and serving as conditions for screen control, the control information showing control content of the first and second screens; and
    a screen display control unit that refers to the switchover control information storage unit, the screen display control unit comparing the history information with the sight line movement condition and the time condition, the screen display control unit performing control of switching display content and energization control content of each of the first and second screens based on the control information in a case of the history information satisfying the sight line movement condition and the time condition.

2. The screen display device according to claim 1, wherein the sight line movement condition includes sight line movement from the first screen to the second screen, and the time condition includes information of dwell time of the sight line on the first screen.

3. The screen display device according to claim 1, wherein the switchover control information that is stored in the switchover control information storage unit is changed in accordance with a control program of display content.

4. A screen display control method for controlling a plurality of screen display units including a screen display unit having a first screen and a screen display unit having a second screen, the method comprising:
    generating history information based on user sight line information showing a user's sight line, the history information showing movement of the user's sight line between the first and second screens and dwell time of the user's sight line for each of the first and second screens; and referring to a switchover control information storage unit that stores switchover control information including a sight line movement condition and a time condition, and control information, the sight line movement condition and the time condition corresponding to sight line movement and dwell time and serving as conditions for screen control, the control information showing control content of the first and second screens, comparing the history information with the sight line movement condition and the time condition, and performing control of switching display content and energization control content of each of the first and second screens based on the control information in a case of the history information satisfying the sight line movement condition and the time condition.

5. A non-transitory computer-readable recording medium storing a screen display control program for controlling a plurality of screen display units including a screen display unit having a first screen and a screen display unit having a second screen, the program causing a computer to:

generating history information based on user sight line information showing a user's sight line, the history information showing movement of the user's sight line between the first and second screens and dwell time of the user's sight line for each of the first and second screens; and referring to a switchover control information storage unit that stores switchover control information including a sight line movement condition and a time condition, and control information, the sight line movement condition and the time condition corresponding to sight line movement and dwell time and serving as conditions for screen control, the control information showing control content of the first and second screens, comparing the history information with the sight line movement condition and the time condition, and performing control of switching display content and energization control content of each of the first and second screens based on the control information in a case of the history information satisfying the sight line movement condition and the time condition.

* * * * *

UNITED STATES PATENT AND TRADEMARK OFFICE
CERTIFICATE OF CORRECTION

PATENT NO.        : 8,866,860 B2                                    Page 1 of 1
APPLICATION NO.   : 13/659158
DATED             : October 21, 2014
INVENTOR(S)       : Akira Nakayama It is certified that error appears in the above-identified patent and that said Letters Patent is hereby corrected as shown below:

In the Specification

Column 5, Line 31: Delete "seconds" and insert -- 10 seconds --

Signed and Sealed this
Twenty-fourth Day of March, 2015

Michelle K. Lee
*Director of the United States Patent and Trademark Office*